United States Patent [19]

Nestor, Jr.

[11] 3,899,337
[45] Aug. 12, 1975

[54] MULTILAYER FILM PACK WITH SCRATCH REDUCING MEANS
[75] Inventor: John W. Nestor, Jr., Carlisle, Mass.
[73] Assignee: Polaroid Corporation, Cambridge, Mass.
[22] Filed: Dec. 28, 1973
[21] Appl. No.: 429,042

[52] U.S. Cl. .................... 96/76 C; 96/201; 354/86; 354/304
[51] Int. Cl. ............................................ G03c 1/48
[58] Field of Search ....... 96/76 C, 201; 354/86, 304

[56] References Cited
UNITED STATES PATENTS
3,165,039    1/1965   Downey .......................... 354/304
3,479,184   11/1969   Land et al ......................... 354/86

Primary Examiner—Norman G. Torchin
Assistant Examiner—Richard L. Schilling
Attorney, Agent, or Firm—Philip G. Kiely

[57] ABSTRACT

A photographic film package which contains flat, multilayer photographic film units adapted for use in diffusion transfer processes to form photographic images. Means are employed to prevent scratching of the photosensitive element by grit or dirt as it is removed from the exposure position in the film pack.

6 Claims, 4 Drawing Figures

MULTILAYER FILM PACK WITH SCRATCH REDUCING MEANS

BACKGROUND OF THE INVENTION

This invention relates to film packages for cameras in which a diffusion transfer process is utilized to form photographic images, and more particularly to a film package wherein a plurality of multilayered photographic film units are stored in flat rather than roll form.

Film packages of the type described may take the form of a generally flat, elongated container having an exposure opening in the form of an opening in one longitudinal wall through which light from the scene being photographed can be focused, and an exit opening in the form of an opening in one transverse end through which a film unit can be withdrawn from the container subsequent to exposure for processing by the camera. Each film unit may include a negative and a positive in the form of a pair of sheets, each of which has a photographic coating on one surface; and the format may be such that the sheets are in superposed relationship with the coatings of each sheet facing in the direction of the exposure opening. A pressure plate is usually between the sheets to urge the sheet containing the image-receiving coating into a plane that coincides with the focal plane of the camera into which the film package is inserted. Web means interconnect the sheets and are cooperable with the pressure plate so that the sheet containing the image-receiving coating can be longitudinally moved relative to the container until the last-mentioned sheet is positioned in registration with and adjacent to the other sheet, with the coated surface of each facing the other. In this condition, the sheets are in what is termed contacting registration and the introduction of processing liquid between the sheets effects the transfer of the image from one sheet to the other. Such introduction takes place when both sheets are longitudinally moved as a unit through the exit opening of the container and between the bite of a pair of pressure rollers mounted on the camera. The construction may be such that initial movement of the sheets as a unit fractures a pod holding the processing liquid and attached to the film unit. Upon withdrawal of the unit from the camera, the diffusion transfer process takes place outside of the camera. To facilitate removal of the unit from the film package, the exit opening of the container is made large enough to effect free longitudinal movement of the positive and negative into and through the exit opening.

A film pack of the type described is set forth, for example, in U.S. Pat. No. 3,479,184 issued Nov. 18, 1969.

When the negative is withdrawn from its exposure position around the pressure plate and into superposition with the positive sheet, scratching of the negative may occur as a result of dirt, grit or other foreign matter becoming trapped between the negative and the edge of the film pack at the edge of the exposure opening. As the negative is moved under the edge of the exposure opening, the trapped grit scores the relatively soft surface of the negative. Generally, such defects are not of consequence and are not particularly noticeable in the formation of diffusion transfer positive prints. However, if the negative is retained and enlargements are made therefrom, any defect in the negative can be quite noticeable to the detriment of the positive enlargement made therefrom.

It is, therefore, an object of this invention to provide a film package which is not susceptible to the deficiencies of the prior art. Specifically, the present invention provides means for decreasing or eliminating defects in the negative caused by dirt or grit.

SUMMARY OF THE INVENTION

The present invention is directed to a photographic film package that avoids the problem of negative damage by dirt, grit or other foreign matter during the removal of the exposed negative from the exposure opening. The present invention resides in the employment of a relatively deformable material between the negative and the wall of the film container adjacent the exposure opening. The aforementioned deformable material cushions the negative as it passes the edge of the exposure opening and also entraps the dirt or grit.

DETAILED DESCRIPTION OF THE INVENTION

Figure 1:
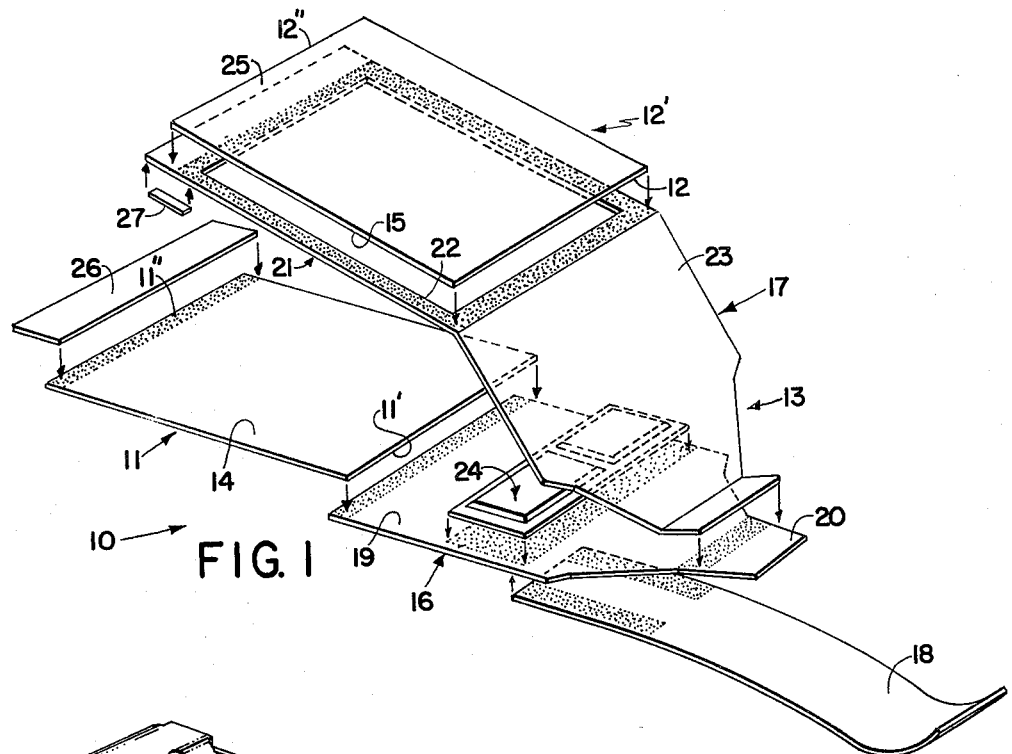
FIG. 1 is a perspective view of a film unit showing the places at which the various components are attached.

Referring now to FIG. 1, a film unit is shown in perspective in order to better illustrate the component parts and the manner in which the latter are interconnected. Basically, the film unit designated by reference numeral 10 includes negative 11, positive 12 and web means 13 interconnecting the two. Negative 11 has image-receiving coating 14 on one surface and positive 12 has image-producing coating 15, both coatings being termed photographic coatings for convenience. Web means 13 includes negative leader 16, positive leader 17 and pull tab 18. Negative leader 16 includes pod-holder portion 19 attached to the leading edge 11' of negative 11, and pull portion 20 at the end of the leader remote from the end to which the negative is attached. The width of pull portion 20 is somewhat reduced to facilitate its threading between the bite of the pressure rollers as will be explained later.

Positive leader 17 includes mask portion 21 provided with rectangular aperture 22 attached to the coated surface 15 of positive 12 for defining the picture area of the positive. In addition, leader 17 includes connector portion 23 by which the leading edge 12' of the positive is connected to the surface of pull portion 20 of the negative leader that faces in the same direction as the coated surface of the negative. As a consequence, connector portion 23 of the positive leader can be folded over pod-holder portion 19 of the negative leader to permit the coated surfaces of the positive and negative to face each other. The lengths of portions 19 and 23 are such that the positive and negative and in contacting registration, which is to say that the latent image on the negative can be transferred to the positive completely filling the area defined by opening 22.

The remaining part of web means 13 is pull tab 18 which is releasably attached to the surface of negative leader that faces in the opposite direction to the coating on negative 11. Film unit 10 also includes frangible pod 24 containing the processing liquid for effecting the diffusion transfer process and attached to the same surface of leader portion 19 as connector portion 23. The remaining parts of the film unit include a skirt on extension 25 to mask 21 attached to the trailing edge 12" of the positive, and extension 26 attached to the trailing edge 11" of the negative. In cooperation with rails 27 attached to extension 25 and facing in the same direction as the coating on the positive, the extensions 25 and 26 serve as a reservoir to capture and retain and excess processing fluid that would otherwise be extruded at the trailing edge of the film unit as the latter is withdrawn from the camera.

Figure 3:
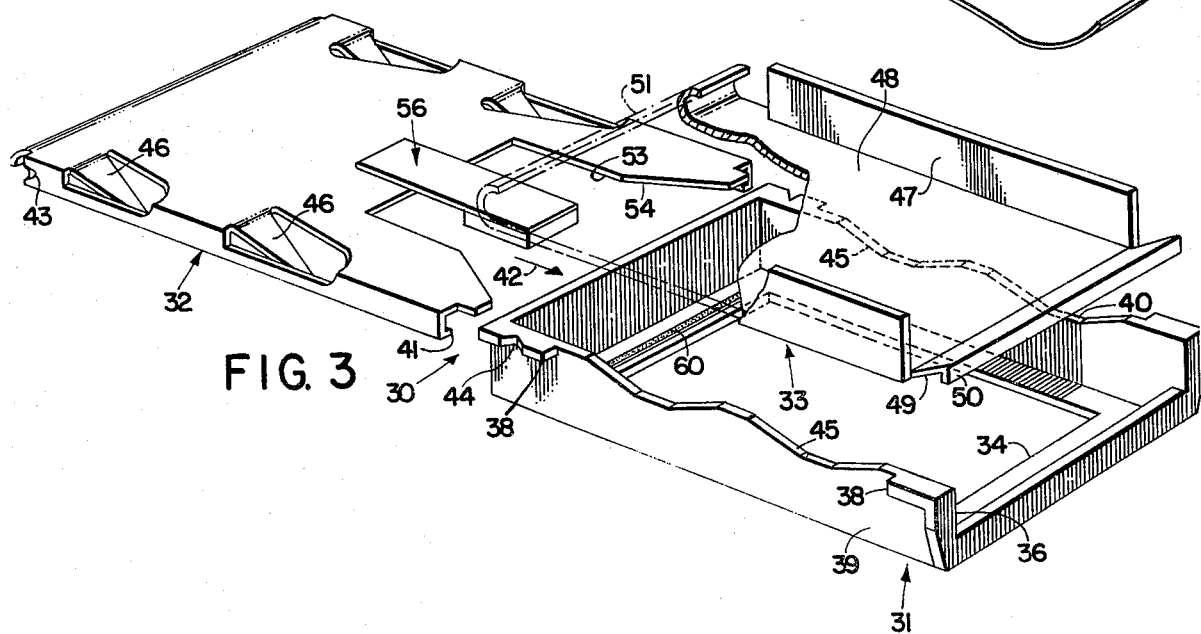
FIG. 3 is a perspective view of the three elements that make up the container.
Figure 2:
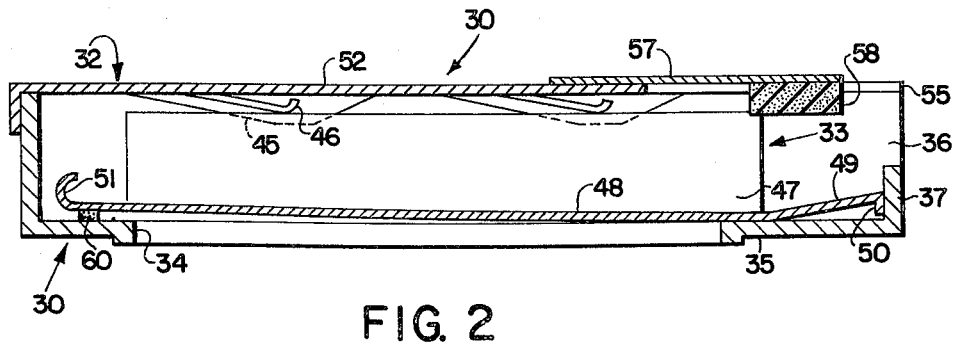
FIG. 2 is a longitudinal side view of the film container in section.

The positioning of the film unit and its relationship to the scratch prevention means in the film container designated by reference numeral 30 and shown in section in FIG. 2 and in perspective in FIG. 3, can best be understood by first considering the construction of the container. Container 30 includes main housing 31, top 32 and pressure plate 33, and is essentially a generally flat elongated body having an exposure opening therein in the form of opening 34 in longitudinal flat wall 35 through which light from the scene being photographed can be focused; and an exit opening in the form of opening 36 in transverse end wall 37 through which a film unit can be withdrawn from the container subsequent to exposure for processing. Adjacent opening 34 in longitudinal flat wall 35 is scratch prevention means 60, adapted to cushion the film unit resting on pressure plate 33 from contact with the edge of opening 34. Housing 31 defines longitudinal wall 35 and transverse wall 37 of the container. Lugs 38 on the upstanding longitudinal walls 39 and 40 are cooperable with inturned flanges 41 on top 32 such that the latter can be slid longitudinally onto the housing in the direction of arrow 42 (FIG. 3) to define longitudinal wall 52 of the container opposite to wall 35. Detent 43 in top 32 is engageable with recess 44 in one of the lugs 38 to securely retain the top on the housing.

Sides 39 and 40 of the housing are provided with spring receiving notches 45 into which spring tabs 46 punched from the top extend when the latter is locked in position. Tabs 46 have considerable width and project into the interior or the housing and into engagement with the top edge of upstanding longitudinal walls 47 of pressure plate 33 which are positioned adjacent to walls 39 and 40 of the housing when the plate is inserted therein. Spring tabs 46 urge negative engaging face 48 of the plate toward wall 35 as shown in FIG. 2. At one end of face 48 is extension 49 projecting at an inclination to the plane of face 48 and terminating in an upturned flange 50 that abuts wall 37 when the plate is inserted in the housing. At the other end of face 48 is rounded guide 51. The assembled container shown in FIG. 2 contains no film units, however, and face 48 rests against wall 35 and scratch reducing means 60 urged there by springs 46. Guide 51 is slightly spaced from the transverse wall opposite to wall 37 film unit when the latter is inserted into the container.

The longitudinal surface 52 of the container defined by top 32 is provided, at the end adjacent wall 37, with a relieved portion defined by rectangular cut-out 53 that merges with trapezoidal cut-out 54 at the transverse edge 55 of the top adjacent exit opening 36. Openings 53 and 54 are provided for clearance needed by auxiliary apparatus (not shown in FIG. 2) attached to the camera for the purpose of engaging one of the sheets of the film unit as the latter is drawn between the bite of the pressure rollers and controlling the transverse flow of the processing liquid between the sheets of the film unit. Such auxiliary apparatus is shown in more detail in U.S. Pat. Nos. 3,165,039, and 3,241,468. The above-described container is conventional and the improvement therein is scratch elimination member 60 which is suitably attached adjacent opening 34 facing pressure plate 33.

Figure 4:
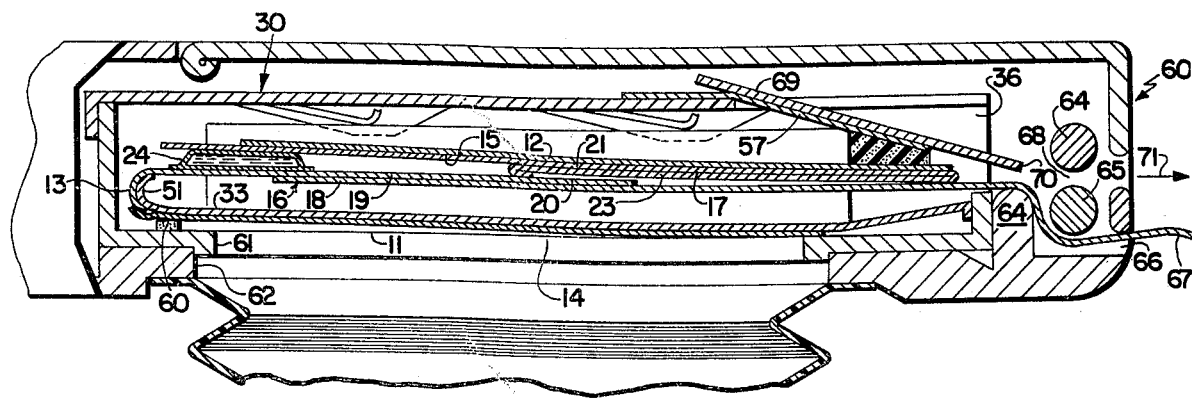
FIG. 4 is a longitudinal side view of a film container inserted in a camera and holding a single film unit.

To understand the results achieved by the use of scratch elimination member 60, a description of the operation of a film package will be helpful. In FIG. 4 container 30 has been inserted into a camera of the type described and designated by numeral 60 so that the inner surface of wall 35 is coplanar with the focal plane of the camera. Upstanding lips 61 defining opening 34 cooperate with opening 62 in the camera to correctly align the container relative to the optical axis of the camera. A single film unit like that shown at 10 in FIG. 1 is shown inserted in the container, it being understood that the drawing is limited to a single unit to facilitate illustration of the operation of the device, although in practice, the container would have a plurality of film units therein. The format is such that the coating on surface 14 of negative 11 faces in the same direction as the coating on surfaces 15 of positive 12, and the negative and positive are in superposed relationship. Pressure plate 33 is between the negative and the positive and the plate urges the image-forming coating of negative 11 into the focal plane of the shutter independently of exerting any bias on the positive. At the end of the opening 34 next adjacent to guide 51 of pressure plate 33 is scratch reducing member 60 which displaces the negative slightly from contact with the edge of opening 34, but there is not sufficient displacement of that end of the negative from the focal plane of the shutter to be detectable in the image produced by the negative. Web means 13 interconnects the negative with the positive. Thus, portion 23 of positive leader 17 is folded back onto portion 21 thereof and extends longitudinally from the leading edge of the positive toward the trailing edge thereof. Portion 19 of negative leader 16, connected to the remote end of portion 23, extends longitudinally toward the transverse wall on container 30 that is opposite wall 37, curving 180° around guide 51. Portion 20 of leader 16 extends toward the opening 36. Pull tab 18 extends through opening 36 and over guide 63 on the camera that is adjacent wall 37 and serves to narrow slightly the exit opening through which the film units are withdrawn. Tab 18 continues to one side of the pressure rollers 64 and 65 and through tab opening 66 in the transverse end of the camera. Free end 67 of tab 18 is thus outside the camera and can be grasped and pulled by an operator to achieve the first step in removing the film as shall be explained later.

Positive-holder 56 extends into cut-outs 53 and 54 as indicated. Member 57 is deformed by auxiliary apparatus 69 so that block 58, that normally just engages the surface of the positive reverse to the surface having coating 15 when the container is filled to capacity, is pressed down into frictional engagement with the positive. The pull on tab 18 tends to cause the positive to be pushed into tighter engagement with the block during the first step by which portion 20 is exposed for the operator to grasp.

It should be noted that the plane passing parallel to the focal plane of the camera and through the space 68 defining the bite of rollers 64 and 65 lies within opening 36 as defined by the edge of guide 63. Furthermore, tab 18 passing over guide 63 causes portion 20 of web means 13 to be guided into space 68 upon longitudinal displacement of the attached end of the tab toward opening 36. The auxiliary apparatus referred to above as controlling the transverse spreading of the processing liquid is shown schematically at 69, it being a spring loaded member urged toward guide 63 and cooperable therewith to achieve control of the transverse spread of the processing liquid. FIG. 4 also shows how the openings 53 and 54 in top 32 permit the free edge 70 of member 69 to be correctly positioned relative to the guide and the opening 68 and still maintaining the proper inclination relative to the plane of the film unit as the latter is drawn between the bite of rollers 64 and 65.

After an operator has caused surface 14 to be exposed by operating a shutter mechanism (not shown) the film unit is withdrawn from the camera for processing external thereto in two distinct steps. For the first step, the operator grasps free end 67 of tab 18 and sharply pulls in the direction of arrow 71. Web means 13 interconnecting the positive and negative cooperates with pressure plate 33 to cause the longitudinal movement of the end of tab 18, releasably attached to portion 19 of leader 16, to impart a simultaneous longitudinal movement to leader 16. Such movement pulls negative 11 out of superposition with opening 34, over scratch reducing member 60 which cushions its passage past the edge of opening 34 and entraps any dirt or grit, thus preventing damage to the negative. Negative 11 then moves 180° around guide 51 until at least a portion of surface 14 on negative 11 faces surface 15 on the positive; causes portion 20 of leader 16 to extend through bite 68 of rollers 64 and 65 and pass outwardly through opening 72 in the transverse end face of the camera adjacent opening 66; and causes portion 23 of leader 17 to fold under itself. This longitudinal movement continues until the resistance to such movement is greater than the shear resistance of the releasable connection between tab 18 and portion 19. It should be noted that exit 36 is of such size and so located as to effect longitudinal movement of portions 19 and 20 of leader 17, tab 18 prior to separation serving to guide portion 28 through bite 68. In fact, exit 36 is designed to effect longitudinal movement of the positive and the negative without impediment into and through the bite, which is the second step.

Since portion 20 is external to the camera, the operator can now grasp such portion sharply pulling it in the direction of arrow 71. The negative, being directly connected to portion 20 by portion 19, moves with portion 20 and the initial longitudinal displacement of portion 20 causes portion 23, folded upon itself, to unfold completely such that the negative is moved into contacting registration with the positive, and leader portions 19 and 23 are superposed. Simultaneously, pod 24 passes between rollers 64 and 65, is fractured, and releases processing fluid between the two superposed portions 19 and 23. At this point, the positive is directly connected to portion 20 by portion 23, and further displacement of portion 20 draws the two sheets in contacting registration as a unit through space 68 between rollers 64 and 65 until the unit is removed from the film package and the camera as well. During such further displacement, edge 70 of member 69 cooperable with guide 63 controls the transverse flow of processing liquid between the superposed registered positive and negative to achieve the proper distribution.

Figure 5:
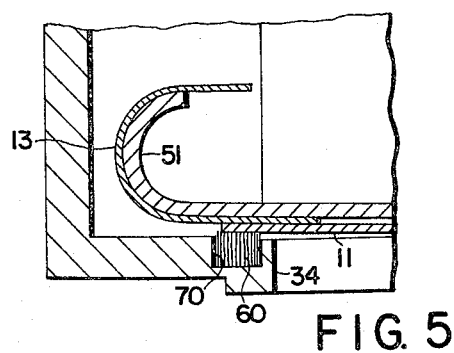
FIG. 5 is an enlarged side view of a film container showing an alternative embodiment of the present invention.

In an alternative embodiment, illustrated in FIG. 5, scratch reducing member 60 is depressed into cutout portion 70 at the edge of opening 34. Thus, negative 11 can ride on scratch reducing member 60, not contacting the edge of opening 34, but the displacement from the focal plane is negligible.

Any suitable relatively deformable material may be employed as scratch reducing member 60. The specific material selected, however, should have a sufficiently low coefficient of friction to avoid any undue restraint on the passage of the negative. In fact, excessive drag at this point could further damage the negative. Woven or nonwoven fabrics or a polymeric foam possessing the above criteria are preferred. In a particularly preferred embodiment, the scratch reducing member comprises a strip of velvet or felt. It should be understood that the scratch reducing member 60 may extend across the entire edge of opening 34 or may be disposed intermittently in sequence across the edge. In order to most efficiently trap the dirt and grit, scratch reducing member 60 is disposed across the entire edge of opening 34 as shown in FIG. 3.

What is claimed is:

1. A photographic film package comprising:
   a generally flat, elongated container having an exposure opening in one flat wall and an exit opening at one transverse end;
   a film unit including a photosensitive sheet element, a non-photosensitive sheet element and a rupturable container retaining a fluid processing composition, said photosensitive sheet element being cooperatively associated with said exposure opening and adapted to be exposed to light transmitted through said exposure opening;
   web means interconnecting said sheet elements including means by which said photosensitive sheet can be moved into contacting superposition with said non-photosensitive sheet element; and
   scratch reducing means mounted on said flat wall having said exposure opening and contacting said photosensitive sheet element, said scratch reducing means adapted to contact substantially the entire surface of said photosensitive sheet element as said photosensitive sheet element is moved into contacting superposition with said non-photosensitive sheet element.

2. A photographic film package as defined in claim 1 wherein said scratch reducing means cushions and displaces said photosensitive sheet element from substantial contact with one edge of said flat wall.

3. A photographic film package as defined in claim 2 wherein said scratch reducing means comprises a deformable member of relatively low coefficient of friction.

4. A photographic film package as defined in claim 3 wherein said scratch reducing means comprises a fabric.

5. A photographic film package as defined in claim 4 wherein said fabric is velvet.

6. A photographic film package as defined in claim 5 wherein said velvet is substantially coextensive with one edge of said exposure opening.

* * * * *